United States Patent
Brown et al.

(10) Patent No.: US 6,640,203 B2
(45) Date of Patent: Oct. 28, 2003

(54) PROCESS MONITORING IN A COMPUTER SYSTEM

(75) Inventors: Roger S. Brown, deceased, late of London (GB), by Joanna Susan Flanders, legal representative; Karen C. Roles, Send (GB); Simon G. Applebaum, Eton Wick (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/828,495

(22) Filed: Apr. 5, 2001

(65) Prior Publication Data

US 2002/0116151 A1 Aug. 22, 2002

Related U.S. Application Data

(63) Continuation of application No. PCT/GB99/03342, filed on Oct. 8, 1999.

(51) Int. Cl.[7] .................. G06F 11/30; G06F 15/00; G21C 17/00
(52) U.S. Cl. .................................................. 702/186
(58) Field of Search ........................................ 702/186

(56) References Cited

U.S. PATENT DOCUMENTS 5,748,882 A * 5/1998 Huang ........................ 714/47
5,805,798 A * 9/1998 Kearns et al. ............... 714/48
5,964,831 A * 10/1999 Kearns et al. ............... 709/201
6,453,430 B1 * 9/2002 Singh et al. ................. 714/47

OTHER PUBLICATIONS http://www.codeproject.com/threads/ProcMon.asp.*
http://www.microsoft.com/msj/defaultframe.asp?page=/msj/0199/nerd0199.htm&nav=/msj/0199/newnav.htm.*

* cited by examiner

Primary Examiner—John Barlow
Assistant Examiner—Anthony Dougherty
(74) Attorney, Agent, or Firm—Meyertons Hood Kivlin Kowert & Goetzel, P.C.; B. Noël Kivlin

(57) ABSTRACT

The health of a process is monitored in a computer system by a process monitor. The monitored process (a configuration management system daemon (CMSD)) is not a child of the process monitor. The process monitor uniquely determines the identity of a monitored process and verifies the correct operation of the monitored process. In the absence of verification of the correct operation of the monitored process, the monitored process is caused to initiate. On successful initiation of the monitored process, the monitored process is uniquely identified to the system and is detached from the process monitor. Each monitored process is arranged to write, on initiation, its unique process identification information (PID) to a file, which file is then accessed by the process monitor to identify the process monitor. The process monitor can interrogate the operating system to verify correct operation of the CMSD. As an alternative, the process monitor could test whether the CMSD is functioning by making service requests to the CMSD.

44 Claims, 14 Drawing Sheets

PROCESS MONITORING IN A COMPUTER SYSTEM

This application is a con't of PCT/GB99/03342 filed Oct. 8, 1999.

BACKGROUND OF THE INVENTION

The invention relates to monitoring processes in a computer system. More particularly, the invention relates to a method for monitoring a computer process, to a monitor for monitoring a computer process, to a configuration management system for a computer system and to a computer system incorporating a computer system process and/or a managed process.

The invention find particular, but not exclusive, application to the monitoring of a process called a configuration management system (CMS) daemon (CMSD). A daemon provides a background service in a computer system.

A CMSD manages various system entities, or objects, which could be physical devices or could be software entities. In a particular example, a CMSD is connected via a UNIX socket via an application program interface (API) to application programs (UNIX is a registered trademark in the United States and other countries, exclusively licensed through X/Open Company, Ltd.). The behavior of the CMSD is specified using CMS definitions (CMSDEFs). A CMSDEF includes declarations for objects managed by the CMSD, state evaluations (statements for evaluating the states of objects), and transition code which is executed when a transition occurs between the states of an object.

The CMSDEFs can be thought of as being similar to a set of state machines for the objects to be managed, and the CMSD executes the state machines.

As mentioned, an example of a CMS operates as a daemon (i.e., it supplies a management service in the background). If the CMSD service becomes unavailable, then at least aspects of the operation of the computer system may be compromised. For example, in a particular example of a CMSD for use in a fault tolerant computer system, if the CMSD service becomes unavailable, then the fault tolerance can be compromised. Accordingly, it is necessary to monitor the CMSD to ensure that should it die during operation some corrective action will be taken.

In a prior example of a CMSD for a fault tolerant computer system operable under the UNIX operating system, a simple monitor was provided. This monitor was configured to search for the name of the CMSD process in a UNIX process table. If the process table no longer contained any process of that name, the monitor generated an error message. Of course, a process masquerading as CMSD, or a child of CMSD, or even a non-functioning CMSD that had not been flushed from the process table, would satisfy this monitor. Additionally, with the prior example of a CMSD monitor, the only facility offered was to indicate when the CMSD died, without any recovery being effected. As a result it was necessary for the operator to restart the CMSD manually.

An approach to process monitoring could be based on a system which implements a parent-child approach to process creation, for example in the manner of a UNIX style operating system. With such an approach, a monitored process would be created by a process monitor in the form of a further process that always acts as the parent of the monitored process. This would give the monitor process direct access to information about the monitored process and would usually include it being informed about the death of the monitored process by the operating system. However, the reliance on a direct parent-child relationship puts constraints on the overall system. Also, the monitored process might fail in ways that would not be communicated to its parent by the operating system.

Accordingly, an aim of the invention is to provide for process monitoring with a higher degree of reliability than is available with prior approaches, while still providing for flexible operation and, where possible, automatic restarting of a monitored process that has failed.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a method of monitoring by a process monitor of a process in a computer system, where the monitored process is not a child of the process monitor. The process monitor uniquely determines the identity of a monitored process and verifies the correct operation of the monitored process. In the absence of verification of the correct operation of the monitored process, the monitored process is caused to initiate (to restart). On successful restarting of the monitored process, the monitored process is uniquely identified to the system.

In accordance with another aspect of the invention, there is provided a method of initiating a process to be monitored in a computer system. The method of initiating a process to be monitored comprises the spawning of a new process by, for example, an upgrade version of an existing process, and then the new process checking that it is operable. In response to a positive result to the tests, the monitored process uniquely identifies itself to the computer system and causes the existing monitored process to terminate, whereby the new process becomes the monitored process.

In accordance with a further aspect of the invention, there is provided a computer system comprising a process to be monitored, the process to be monitored being configured, on successful initiation (starting), uniquely to identify itself to the system, and a process monitor configured: uniquely to determine to identity of a monitored process; to verify correct operation of the monitored process; and, in the event of being unable to verify correct operation of a monitored process, to cause the monitored process to initiate (to restart).

It should be noted that where reference is made to initiating a process, this can relate to starting a new process or an upgrade version of a process, or restarting an existing process, as appropriate. The monitoring of processes in the manner of an embodiment of the invention means that there is no need to rely on a parent child relationship. This enables 'abdication' by one process to an upgrade version of that process while still providing continuity and reliable monitoring.

In accordance with yet another aspect of the invention, there is provided a process monitor for such a computer system, the process monitor being configured uniquely to determine to identity of a monitored process, to verify correct operation of the monitored process, and, in the event of being unable to verify correct operation of a monitored process, to cause the monitored process to initiate (to restart).

In accordance with yet a further aspect of the invention, there is provided a process to be monitored, for example in the form of a configuration management system for such a computer system, which is configured, on being initiated (started) by a process monitor, to check that it is operable; and, if so, to provide an indication of this to the process monitor prior to detaching itself from the process monitor.

An embodiment of the invention thereby seeks to provide a solution to the limitations of the prior approaches by providing a process monitor that can monitor the health (or successful operation) of one or more monitored processes that are not children of the process monitor. The process monitor seeks uniquely to identify a monitored process. If successful, it then carries out checks on the process to ensure that the process is still operating. In the event that the process has died, the process monitor then restarts the monitored process. Checks are performed on the monitored process (for example the monitored process may perform self-tests) to ensure it can proceed, before indicating to the monitor process that it has successfully started. An embodiment of the invention enables monitoring of processes without relying on a parent-child relationship and permits new or upgrade versions of processes to be started and for control to be passed reliably from an old process to a new or upgrade process.

The step of determining the identity of a monitored process can involve accessing a pre-determined file or other location containing the process identification information, which is unique to the monitored process. Each monitored process can be arranged, on initiation, to write its process identification (PID) information to the file so that it is then available for the process monitor to access. If the process monitor is unable to access the file, or accesses the file and does not find a PID for a process which it expects to find there, the system has no information relating to that PID and it will cause the monitored process to be initiated (started).

The restarting of the monitored process is preferably effected in two steps.

The first step causes the monitored process to start up and to perform checks to ensure that it should be operable (i.e. able to execute or function successfully). This can involve, for example, verifying that it can correctly establish a database needed for carrying out its various functions. The monitored process can be very critical of its operability at this stage, so that it does not continue if there are potential faults.

If the monitored process is not able to execute successfully, it can be arranged to handshake with the process monitor, indicating that it could not execute. The process monitor can be arranged to issue an error message to the user indicating that some kind of manual intervention is necessary to fix the problem, which causes the monitored process to fail. No further attempts are made to start the monitored process until the manual intervention has been completed.

Alternatively, if the monitored process was able to execute successfully, the second step in restarting the monitored process occurs. The monitored process writes its PID to the predetermined file and then handshakes with the process monitor indicating that it is able to execute successfully. The process monitor then proceeds to monitor the new monitored process.

This mechanism ensures that the monitor process will not thrash in order to try to get a faulty monitored process running. For example, if the monitored process is a CMSD and it is attempting to operate on erroneous CMSDEFs, then the initial monitored process (CMSD) would terminate with an error message to the process monitor. The process monitor would then be arranged to issue an error message to alert an operator to the fact that the monitored process would not run. Without the two step process, the monitoring process could thrash while trying repeatedly to start a CMSD that had failed immediately on start-up, for example as a result of a configuration problem. The two step process avoids the process monitor needing to have to differentiate between a CMSD that failed randomly and one that would always fail. It should be noted that the invention finds particular, but not exclusive, application to the operation of a CMSD as the monitored process.

In accordance with another aspect of the invention, a similar approach to starting a new process is involved when one process spawns another, for example to take account of system changes. An example of this is where an upgrade version of a monitored process (an upgrade process) initiates a new CMSD to accommodate changes to the CMSDEFS. The old CMSD and the new CMSD perform checks to ensure that the new CMSD can run in a stable manner. Only when this has been confirmed, does the new CMSD write its PID to the PID file and request the old CMSD to terminate.

In a particular embodiment of the invention, a CMSD (the monitored process) writes its PID to a file known to the process monitor. The process monitor then reads this and uses it to access the CMSD process information at regular intervals from the processor file system. Should the process information indicate that a CMSD is no longer alive, an alarm is asserted and an attempt made to spawn a new CMSD. The CMSD always 'backgrounds itself' (i.e. it forks, then the parent exits), so the monitor will still not be the parent. In order to avoid system thrashing (i.e., continually restarting a CMSD that is unable to run because of its configuration or environment, for example), the newly started CMSD performs 'self tests' before "backgrounding" itself. By "backgrounding" itself is meant that it detaches itself from other processes so as to operate independently in the background. The success or otherwise of these tests is passed back to the monitor using the parent's exit code, and should the tests have failed, further restarts are suppressed. Once a successful CMSD is in place (either by external intervention, or because CMSD was successfully restarted by the monitor), the alarm is de-asserted and the monitoring continues. If the CMSD needs to be upgraded, a protocol exists to allow a new CMSD to take over from the old CMSD without interrupting the service. When this happens, the monitor must switch from monitoring the old CMSD to monitoring the new CMSD safely. This is achieved by the new CMSD writing its PID to the file (for the benefit of the monitor) only when it has successfully taken over the service, and immediately before it instructs the old CMSD to exit.

The process monitor can interrogate the operating system to verify correct operation of the CMSD. As an alternative, the process monitor could test whether the CMSD is functioning by making service requests to the CMSD. Such an approach, while providing a higher degree of security than interrogating the operating system, would involve a higher overhead due to the extra processing by the CMSD.

The process monitor and/or the monitored process can be in the form of computer programs comprising computer code, or instructions, defining the functionality of the process monitor and/or monitored process.

Accordingly, an aspect of the invention also provides a carrier medium carrying process means for controlling a process to be monitored for a computer, the process means being configured, on being initiated by a process monitor, to check that it is able to operate successfully, and, if so, to provide an indication of this to the process monitor prior to backgrounding itself.

An aspect of the invention also provides a carrier medium carrying process means for initiating a process to be monitored for a computer, the process means being configured, on being spawned by an existing monitored process, to check that it is able to function correctly, and, in response to a positive result to the tests, uniquely to identity itself to the system and to terminate the existing monitored process, whereby the new process becomes the monitored process.

An aspect of the invention further provides a carrier medium carrying process means configured to define a process monitor for a computer, the process monitor being configured uniquely to determine to identity of a monitored process, to verify correct operation of the monitored process, and, in the event of being unable to verify correct operation of a monitored process, to cause the monitored process to initiate.

The carrier medium can be any form of carrier medium for carrying computer program code, whether that be a magnetic, optical or any other form of data storage such as a tape, disk, solid state, or other form of storage providing random or read-only or any other form of access, or a transmission medium such as a telephone wire, radio waves, etc.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
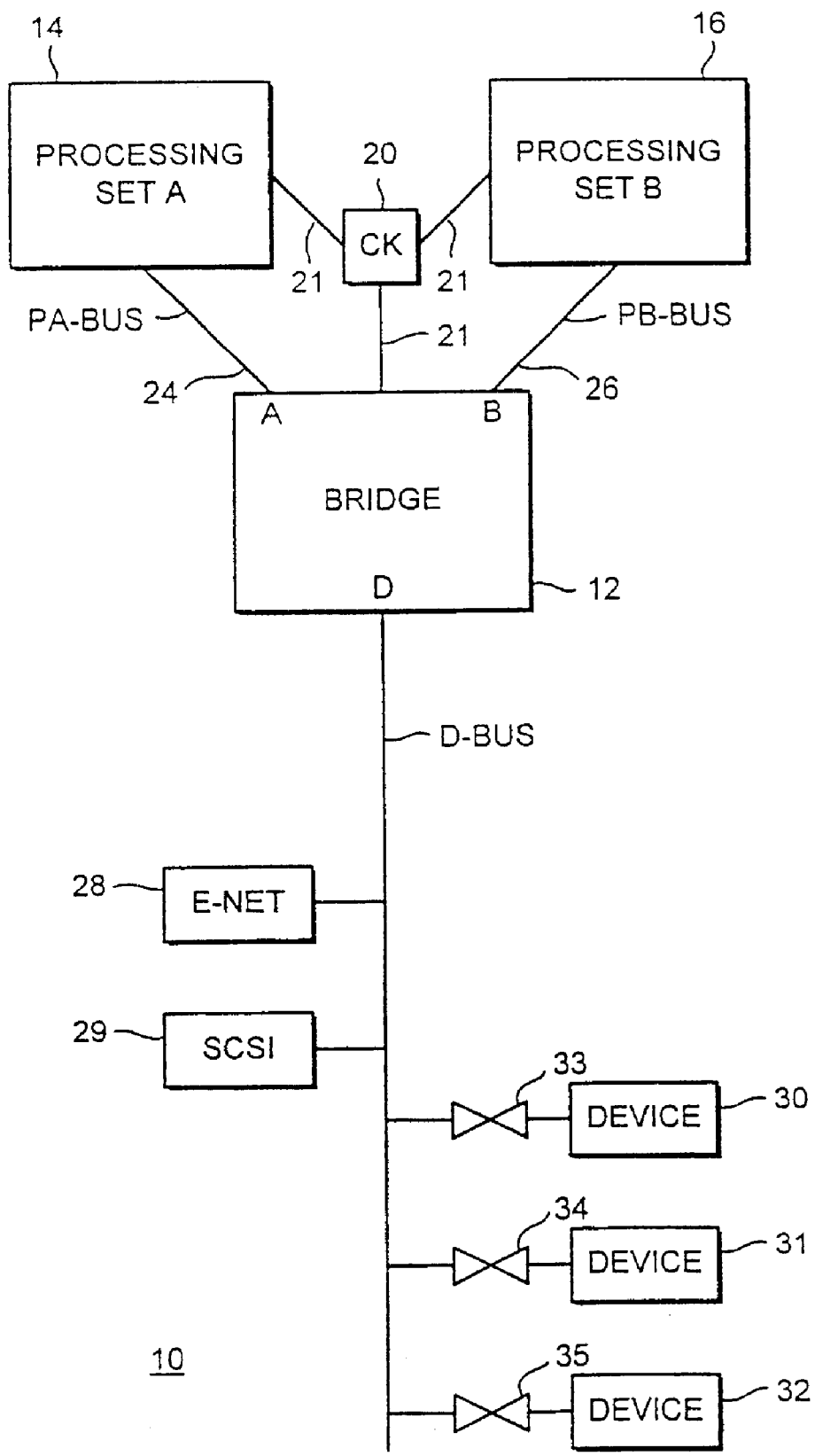
FIG. 1 is a schematic overview of a fault tolerant computer system incorporating an embodiment of the invention.

FIG. 1 is a schematic overview of a fault tolerant computing system 10 comprising a plurality of CPUsets (processing sets) 14 and 16 and a bridge 12. As shown in FIG. 1, there are two processing sets 14 and 16, although in other embodiments there may be three or more processing sets. The bridge 12 forms an interface between the processing sets and I/O devices such as devices 28, 29, 30, 31 and 32. In this document, the term "processing set" is used to denote a group of one or more processors, possibly including memory, which output and receive common outputs and inputs. It should be noted that the alternative term mentioned above, "CPUset", could be used instead, and that these terms could be used interchangeably throughout this document. Also, it should be noted that the term "bridge" is used to denote any device, apparatus or arrangement suitable for interconnecting two or more buses of the same or different types.

The first processing set 14 is connected to the bridge 12 via a first processing set I/O bus (PA bus) 24, in the present instance a Peripheral Component Interconnect (PCI) bus. The second processing set 16 is connected to the bridge 12 via a second processing set I/O bus (PB bus) 26 of the same type as the PA bus 24 (i.e. here a PCI bus). The I/O devices are connected to the bridge 12 via a device I/O bus (D bus) 22, in the present instance also a PCI bus.

Although in the particular example described, the buses 22, 24 and 26 are all PCI buses, this is merely by way of example, and in other embodiments other bus protocols may be used and the D-bus 22 may have a different protocol from that of the PA bus and the PB bus (P buses) 24 and 26.

The processing sets 14 and 16 and the bridge 12 are operable in synchronism under the control of a common clock 20, which is connected thereto by clock signal lines 21.

Some of the devices including an Ethernet (E-NET) interface 28 and a Small Computer System Interface (SCSI) interface 29 are permanently connected to the device bus 22, but other I/O devices such as I/O devices 30, 31 and 32 can be hot insertable into individual switched slots 33, 34 and 35. Dynamic field effect transistor (FET) switching can be provided for the slots 33, 34 and 35 to enable hot insertability of the devices such as devices 30, 31 and 32. The provision of the FETs enables an increase in the length of the D bus 22 as only those devices which are active are switched on, reducing the effective total bus length. It will be appreciated that the number of I/O devices which may be connected to the D bus 22, and the number of slots provided for them, can be adjusted according to a particular implementation in accordance with specific design requirements.

Figure 2:
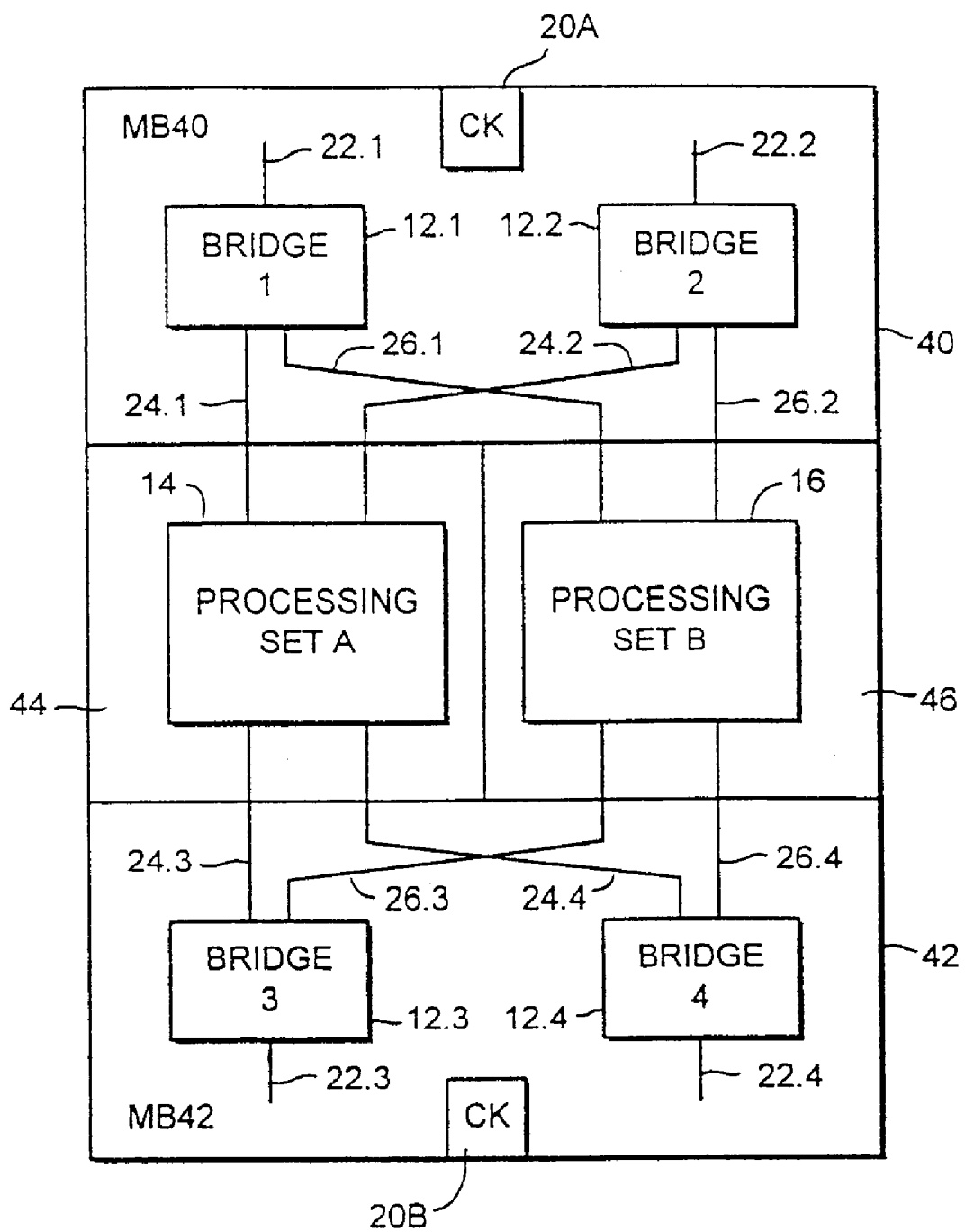
FIG. 2 is a schematic overview of a specific implementation of a system based on that of FIG. 1.

FIG. 2 is a schematic overview of a particular implementation of a fault tolerant computer employing a bridge structure of the type illustrated in FIG. 1. In FIG. 2, the fault tolerant computer system includes a plurality (here four) of bridges 12 on first and second I/O motherboards (MB 40 and MB 42) order to increase the number of I/O devices which may be connected and also to improve reliability and redundancy. Thus, in the embodiment shown in FIG. 2, two processing sets 14 and 16 are each provided on a respective processing set board 44 and 46, with the processing set boards 44 and 46 'bridging' the I/O motherboards MB 40 and MB 42. A first, master clock source 20A is mounted on the first motherboard 40 and a second, slave clock source 20B is mounted on the second motherboard 42. Clock signals are supplied to the processing set boards 44 and 46 via respective connections (not shown in FIG. 2).

First and second bridges 12.1 and 12.2 are mounted on the first I/O motherboard 40. The first bridge 12.1 is connected to the processing sets 14 and 16 by P buses 24.1 and 26.1, respectively. Similarly, the second bridge 12.2 is connected to the processing sets 14 and 16 by P buses 24.2 and 26.2, respectively. The bridge 12.1 is connected to an I/O databus (D bus) 22.1 and the bridge 12.2 is connected to an I/O databus (D bus) 22.2.

Third and fourth bridges 12.3 and 12.4 are mounted on the second I/O motherboard 42. The bridge 12.3 is connected to the processing sets 14 and 16 by P buses 24.3 and 26.3, respectively. Similarly, the bridge 4 is connected to the processing sets 14 and 16 by P buses 24.4 and 26.4, respectively. The bridge 12.3 is connected to an I/O databus (D bus) 22.3 and the bridge 12.4 is connected to an I/O databus (D bus) 22.4.

It can be seen that the arrangement shown in FIG. 2 can enable a large number of I/O devices to be connected to the two processing sets 14 and 16 via the D buses 22.1, 22.2, 22.3 and 22.4 for either increasing the range of I/O devices available, or providing a higher degree of redundancy, or both.

Figure 3:
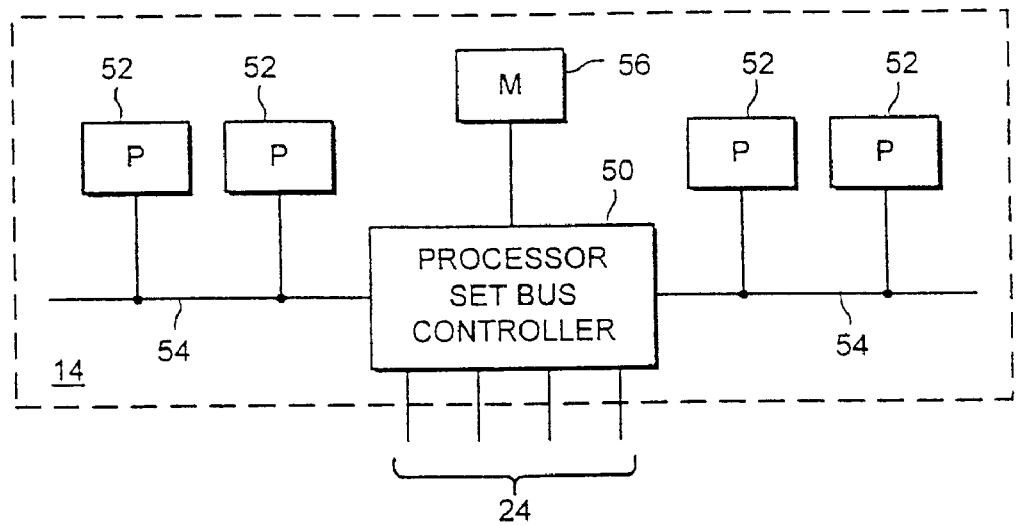
FIGS. 3 and 4 are schematic diagrams of examples of processing sets.

FIG. 3 is a schematic overview of one possible configuration of a processing set, such as the processing set 14 of FIG. 1. The processing set 16 could have the same configuration. In FIG. 3, a plurality of processors (here four) 52 are connected by one or more buses 54 to a processing set bus controller 50. As shown in FIG. 3, one or more processing set output buses 24 are connected to the processing set bus controller 50, each processing set output bus 24 being connected to a respective bridge 12. For example, in the arrangement of FIG. 1, only one processing set I/O bus (P bus) 24 would be provided, whereas in the arrangement of FIG. 2, four such processing set I/O buses (P buses) 24 would be provided. In the processing set 14 shown in FIG. 3, individual processors operate using the common memory 56, and receive inputs and provide outputs on the common P bus(es) 24.

Figure 4:
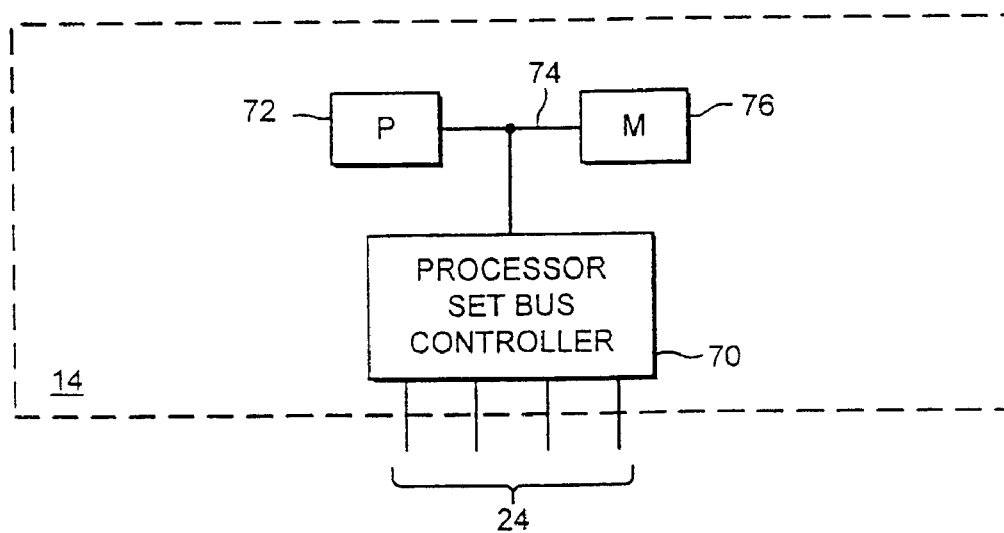

FIG. 4 illustrates an alternative configuration of a processing set, such as the processing set 14 of FIG. 1. Here a simple processing set includes a single processor 72 and associated memory 76 connected via a common bus 74 to a processing set bus controller 70. The processing set bus controller 70 provides an interface between the internal bus 74 and the processing set I/O bus(es) (P bus(es)) 24 for connection to the bridge(s) 12.

Accordingly, it will be appreciated from FIGS. 3 and 4 that the processing set may have many different forms and that the particular choice of a particular processing set structure can be made on the basis of the processing requirement of a particular application and the degree of redundancy required. In the following description, it is assumed that the processing sets 14 and 16 referred to have a structure as shown in FIG. 3, although it will be appreciated that another form of processing set could be provided.

The bridge(s) 12 are operable in a number of operating modes. In a first, combined mode, a bridge 12 is operable to route addresses and data between the processing sets 14 and 16 (via the PA and PB buses 24 and 26, respectively) and the devices (via the D bus 22). In this combined mode, I/O cycles generated by the processing sets 14 and 16 are compared to ensure that both processing sets are operating correctly. Comparison failures force the bridge 12 into an error limiting mode (EState) in which device I/O is prevented and diagnostic information is collected. In a second, split mode, the bridge 12 routes and arbitrates addresses and data from one of the processing sets 14 and 16 onto the D bus 22 and/or onto the other one of the processing sets 16 and 14, respectively. In this mode of operation, the processing sets 14 and 16 are not synchronized and no I/O comparisons are made. DMA operations are also permitted in both modes.

Figure 5:
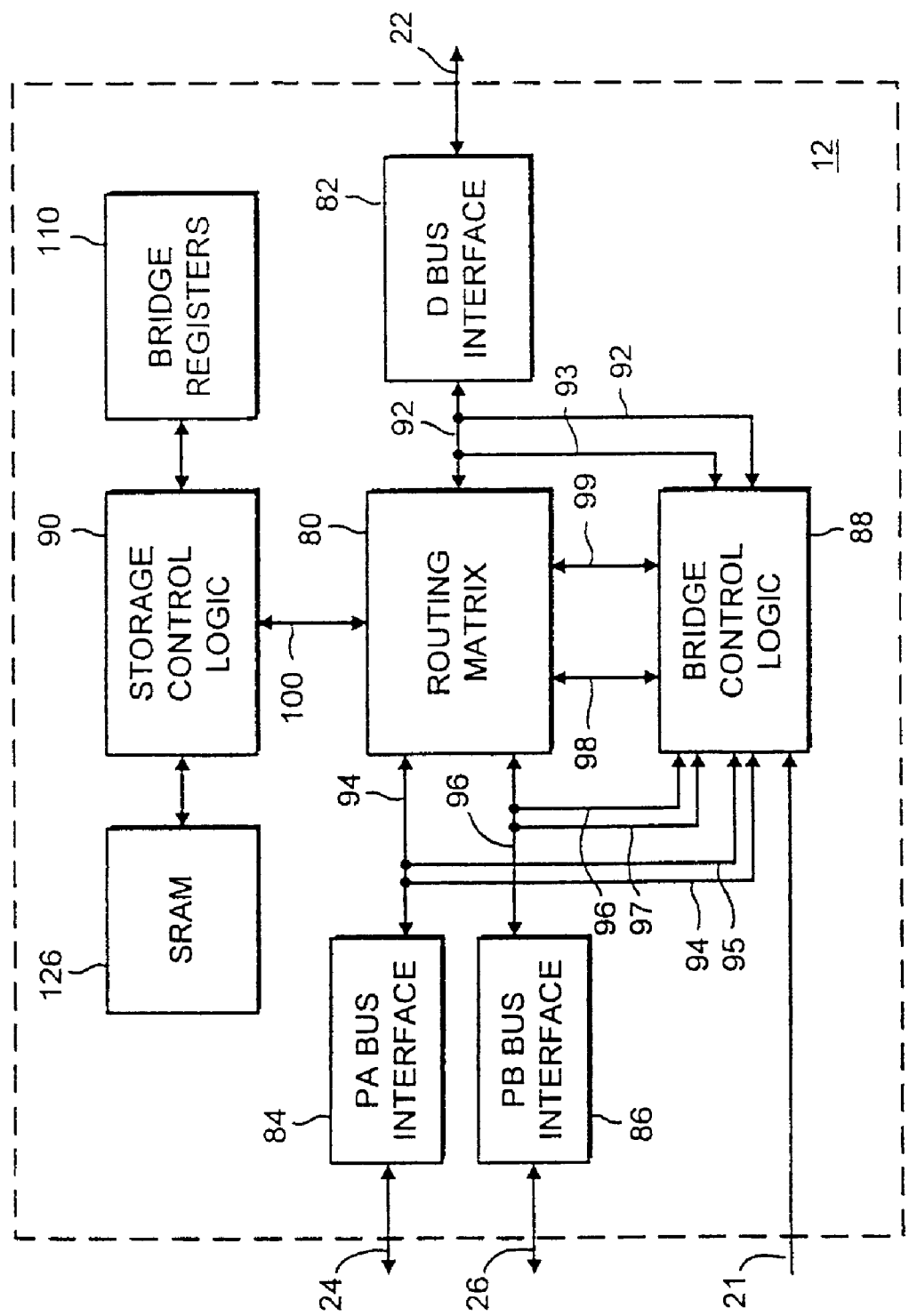
FIG. 5 is a schematic block diagram of an embodiment of a bridge for the system of FIG. 1.

FIG. 5 is a schematic functional overview of the bridge 12 of FIG. 1. First and second processing set I/O bus interfaces, PA bus interface 84 and PB bus interface 86, are connected to the PA and PB buses 24 and 26, respectively. A device I/O bus interface, D bus interface 82, is connected to the D bus 22. It should be noted that the PA, PB and D bus interfaces need not be configured as separate elements but could be incorporated in other elements of the bridge. Accordingly, within the context of this document, where a reference is made to a bus interface, this does not require the presence of a specific separate component, but rather the capability of the bridge to connect to the bus concerned, for example by means of physical or logical bridge connections for the lines of the buses concerned.

Routing (hereinafter termed a routing matrix) 80 is connected via a first internal path 94 to the PA bus interface 84 and via a second internal path 96 to the PB bus interface 86. The routing matrix 80 is further connected via a third internal path 92 to the D bus interface 82. The routing matrix 80 is thereby able to provide I/O bus transaction routing in both directions between the PA and PB bus interfaces 84 and 86. It is also able to provide routing in both directions between one or both of the PA and PB bus interfaces and the D bus interface 82. The routing matrix 80 is connected via a further internal path 100 to storage control logic 90. The storage control logic 90 controls access to bridge registers 110 and to a random access memory (SRAM) 126. The routing matrix 80 is therefore also operable to provide routing in both directions between the PA, PB and D bus interfaces 84, 86 and 82 and the storage control logic 90. The routing matrix 80 is controlled by bridge control logic 88 over control paths 98 and 99. The bridge control logic 88 is responsive to control signals, data and addresses on internal paths 93, 95 and 97, and also to clock signals on the clock line(s) 21.

In the embodiment of the invention, each of the P buses (PA bus 24 and PB bus 26) operates under a PCI protocol. The processing set bus controllers 50 (see FIG. 3) also operate under the PCI protocol. Accordingly, the PA and PB bus interfaces 84 and 86 each provide all the functionality required for a compatible interface providing both master and slave operation for data transferred to and from the D bus 22 or internal memories and registers of the bridge in the storage subsystem 90. The bus interfaces 84 and 86 can provide diagnostic information to internal bridge status registers in the storage subsystem 90 on transition of the bridge to an error state (EState) or on detection of an I/O error.

The device bus interface 82 performs all the functionality required for a PCI compliant master and slave interface for transferring data to and from one of the PA and PB buses 84 and 86. The D bus 82 is operable during direct memory access (DMA) transfers to provide diagnostic information to internal status registers in the storage subsystem 90 of the bridge on transition to an EState or on detection of an I/O error.

Figure 6:
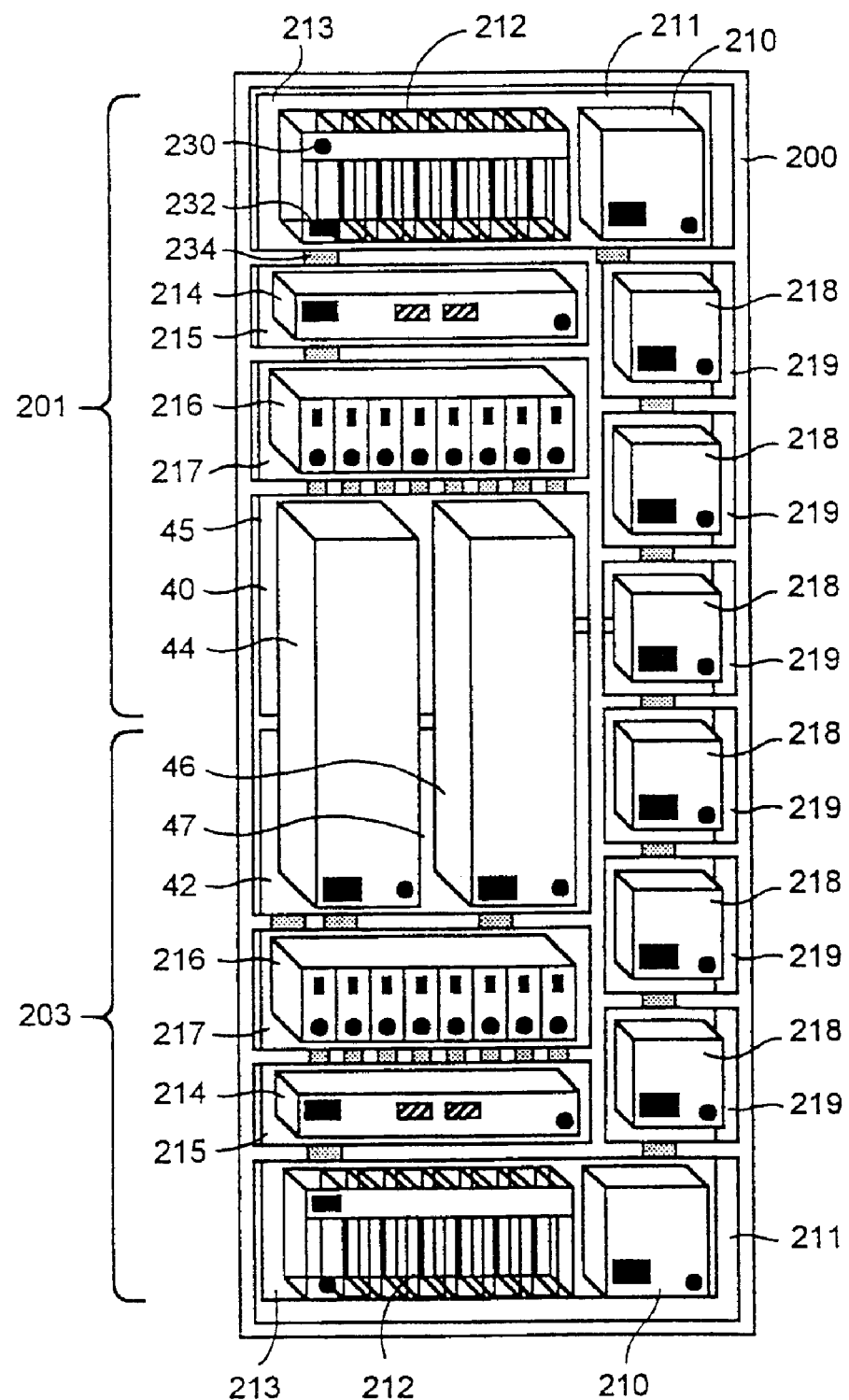
FIG. 6 is a schematic representation of a physical configuration of a computer system chassis with field replaceable units locatable in respective slots.

FIG. 6 is a schematic overview of a chassis 200 with the various slots for receiving field replaceable units (FRUs)

including components, or devices, of the fault tolerant computing system 10 described with reference to FIGS. 1 to 5. Each FRU may contain one or more devices.

Examples of the field replaceable units for use in the system include the two motherboards 40 and 42. These are mounted at locations 201 and 203 in the upper and lower portions of the chassis 200 as viewed in FIG. 6. The first and second processor sets 44 and 46, which also form FRUs, are mounted at locations 45 and 47 bridging the motherboards 40 and 42.

Other field replaceable units illustrated in FIG. 6 are Removable Media Module (RMM) FRUs 210, which are mounted in slots 211. Disk drive chassis FRUs 212 are mounted in slots 213. The disk drives in the disk drive chassis 212 are typically configured as FRUs. Console and Fan (CAF) FRUs 214, which include switches, ports, alarms and LEDs, are mounted in slots 215. PCI frame FRUs 216 are mounted in slots 217. The PCI cards in the PCI frame are also configured as FRUs. Power supply FRUs 218 are mounted in further slots 219. Sub-assemblies (not shown) of the power supply FRUs 218 could also be provided and be configured as FRUs.

The FRUs for insertion in the various slots are provided with an identification label (e.g., DSK) 232. A corresponding label (e.g., A-DSK) 234 is associated with each slot to indicate to the operator where each FRU is to be located. In an embodiment of the invention a FRU comprises a memory 230 (e.g., a non-volatile memory such as an EEPROM) for containing information relating to the FRU and the device(s) it carries. As will be described later, this information includes configuration management system class information for the FRU for use by a configuration management system (CMS) 400 (not shown in FIG. 6) to configure the FRU within the system. It should be noted that an embodiment of the invention may include, in addition to FRUs that include a memory 230, some units that are replaceable in the field, for example a disk drive, but which might not be provided with a memory 230. This may be desirable where, for reasons of economy, a conventional field replaceable unit is used.

Figure 7:
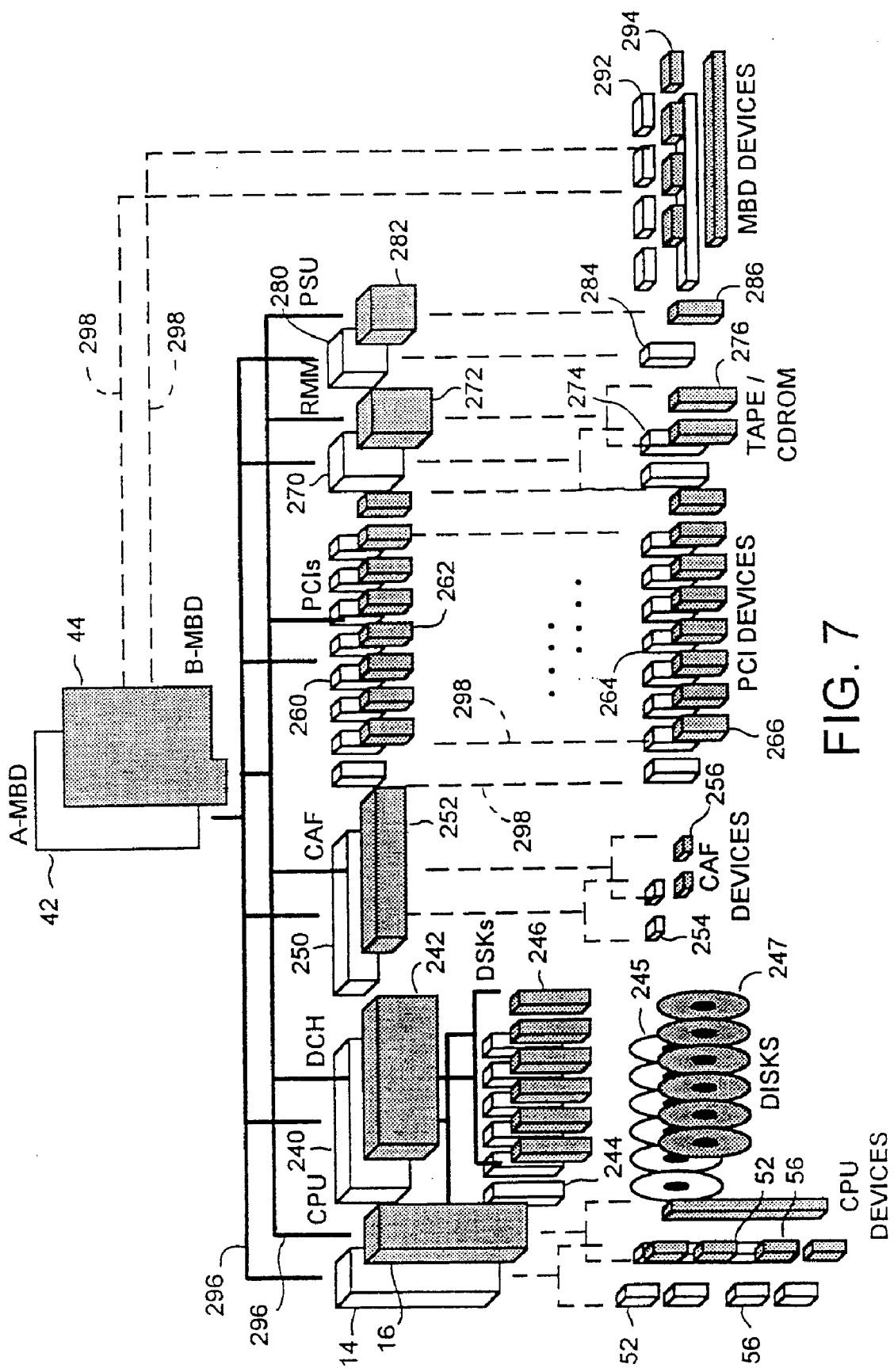
FIG. 7 is a schematic representation of configuration management system representation of the physical configuration of FIG. 7.

FIG. 7 is the schematic representation of the manner in which the CMS models the physical structure of the system.

The CMS does not model the system chassis. The CMS does, however, model the FRUs and the devices therein. The CMS models a containment hierarchy of the FRUs. The model shows the physical dependency of the respective elements. The model indicates the dependency of the FRUs on one of the motherboards. It does not show the dependency of the motherboards on the power supply units. The dependency of the system on the processing sets is shown by the service hierarchy for the processor set sub-system.

As shown in FIG. 7, the CMS models the processing set 14 with the associated processing set devices 52, 56, etc. (see FIGS. 3–5) as dependent on the first motherboard 42. Also modelled as dependent on the first motherboard 42 is a first disk chassis 240 with associated disk drives 244. CAF FRUs 250 with associated CAF devices 254 are also modelled as being dependent on the first motherboard 42, as are PCI adapters 260 and the associated PCI devices 264. A removable media FRU (RMM) 270 and associated media devices (e.g., including tape and CD ROM drives) 274 are further modelled as dependent upon the first motherboard 42, as are the power supply units 280 (possibly also with power supply sub-systems 284). The various motherboard devices 292 of the first motherboard 42 are also modelled by the CMS.

The CMS models the processing set 16 with the associated processing set devices 52, 56, etc. (see FIGS. 3–5) as dependent on the second motherboard 44. Also modelled as dependent on the second motherboard 44 is a second disk chassis 242 with associated disk drives 246. CAF FRUs 252 with associated CAF devices 256 are also modelled as being dependent on the second motherboard 44, as are PCI adapters 262 and the associated PCI devices 266. A removable media FRU (RMM) 272 and associated media devices (e.g., including tape and CD ROM drives) 276 are further modelled as dependent upon the second motherboard 44, as are the power supply units 282 (possibly also with power supply sub-systems 286). The various motherboard devices 294 of the first motherboard 44 are also modelled by the CMS.

In FIG. 7, the solid lines (e.g., 296) illustrate the dependencies of the FRU constituents on the motherboards 42 and 44 (it being remembered that the motherboards are also FRUs). The dashed lines (e.g., 298) illustrate the dependencies of the device constituents on the FRU constituents.

Figure 8:
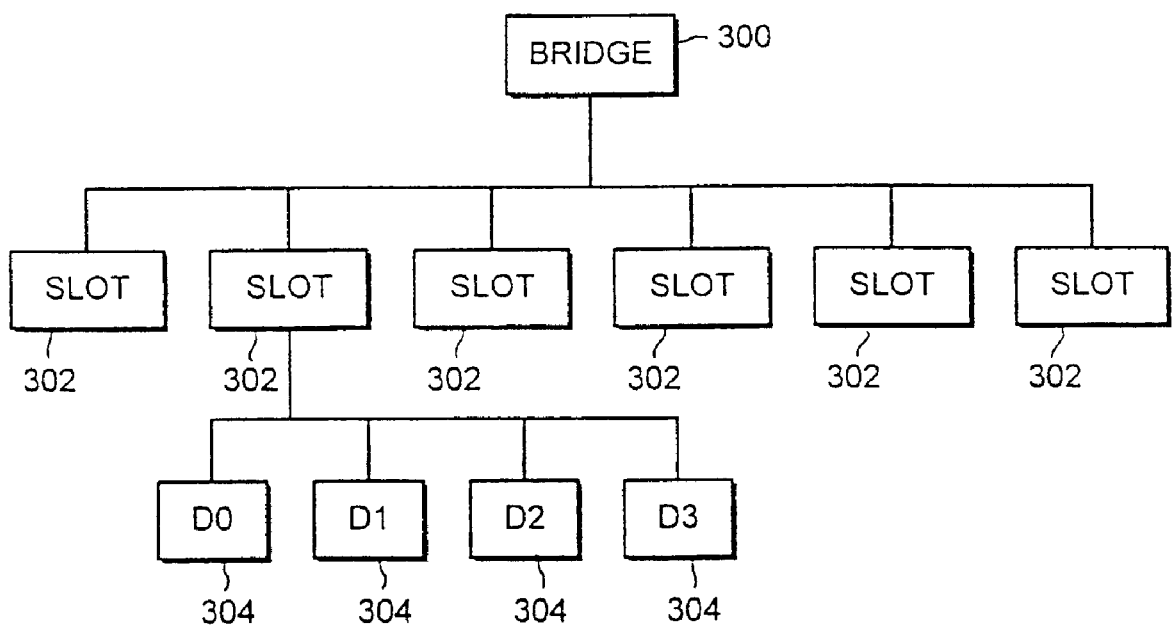
FIG. 8 is a device hierarchy model and FIG. 9 is a service hierarchy model.

FIG. 8 is a schematic representation of the modeling of a device hierarchy by the CMS. The device hierarchy is independent of the FRU hierarchy described with reference to FIG. 7 and is independent of the physical arrangement of the FRUs as different devices can be on different FRUs. The CMS creates this device hierarchy from the class information, and possibly other information, read from non-volatile memory on the FRUs.

The CMS models parts of some of the device tree, with the various elements being shown as nodes, or objects in the tree. Thus, a first node, or object, 300 representing the bridge is linked to individual nodes, or objects 302 representing slot controllers. Similarly, individual devices, such as devices D0, D1, D2 and D3 represented by nodes, or objects 304, are linked to a slot object 302. The CMS is able to use this tree to communicate with individual device drivers, and allows the CMS to model dependencies between the devices.

Figure 9:
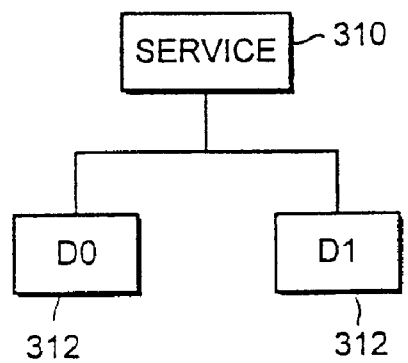

FIG. 9 illustrates a service hierarchy. Service hierarchies can be defined with a service 310 being represented as a node or object within the service hierarchy. A service can define, for example, a sub-system such as a fault tolerant core service. The services define system availability and are dependent on the devices of the system. Devices are also defined in the service hierarchy by nodes, or objects 312 in the service hierarchy. As shown in FIG. 9, dependencies between individual devices 312 such as devices D0 and D1 and the service 310 are represented. The service hierarchy could be derived automatically, but may also be derived manually.

The combination of the hierarchies shown in FIGS. 7, 8 and 9 form the configuration management system (CMS) model which is used to control the operation of the system. The model can be stored in the form of a database in a configuration file. The CMS uses this model to be able to support fault tolerance at a high level. It allows users to configure the various components of the system to carry out desired functions, and to oversee the functioning of the system.

Figure 10:
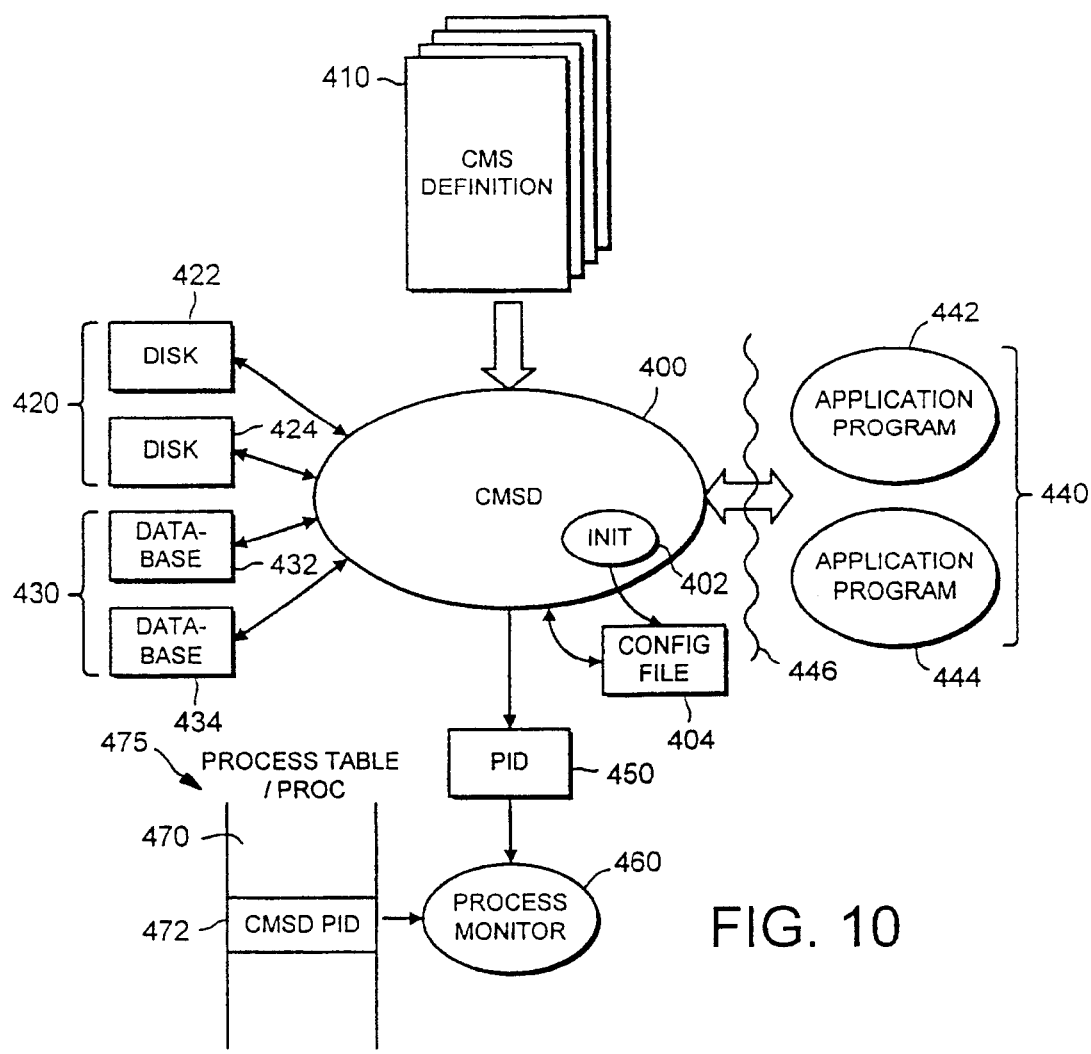
FIG. 10 illustrates the relationships between a configuration management system daemon and further components of the computer system.

FIG. 10 illustrates the relationship between a configuration management system daemon CMSD 400 and various components of the system. The CMSD 400 is a daemon for implementing the control management system of the computer system illustrated in the earlier Figures. A daemon is a background management process. Such a process may be available at any time from system initiation until shutdown.

The CMSD 400 manages various system entities (objects) which can be physical devices and/or software entities. The CMSD 400 is connected via a UNIX socket forming an application program interface (API) 446 to one or more application programs 440. In the present instance two application programs 442 and 444 are shown.

The behavior of the CMSD 400 is specified using CMS definitions (CMSDEFs) 410. The CMSDEFs include declarations for objects that are managed by the CMSD 400, state evaluations (statements for evaluating the states of objects), and transition code that is executed when a transition occurs between the states of an object. The CMSDEFs 410 can be thought of as being similar to a set of state machines for the objects managed by the CMSD 400, with the CMSD 400 executing the state machines.

An initialization component 402 of the CMS is operative on a first initialization of the CMS to create a model of the system as described with reference to FIGS. 7, 8 and 9 and stores this in a configuration file 404. The configuration file 404 forms a persistent copy of the model which can be used by the current invocation of the CMSD and on a subsequent re-boot or re-initialization of the system, assuming that the configuration has not changed or the configuration file has not been lost or damaged. The storage of the model in such a persistent manner can save initialization time as it is not necessary to go through the process of re-creating the model. It can also provide consistency between system initializations. As a result, in a fault tolerant system, it can enable better detection of faults where system elements have failed or changed between system initializations.

The CMSD 400 is operationally connected to various system entities that are managed by the CMSD 400. These entities can include physical devices 420 (for example disk drives 422 and 424) or software entities (for example databases 432 and 434). As will be described hereinafter, the CMSD 400 is associated with a unique processor identification (PID) 450, which the CMSD stores in a storage location, or file 452, known to a monitor process when the CMSD initiates successfully. The operation of the CMSD 400 is monitored by a process monitor 460 using the PID 450 stored by the CMSD 400 in the file 452. The process monitor 460 is configured as a monitor process (program) operable on the computer system. The monitor process 460 and the CMSD 400 are stored in the system memory of the processing sets and are executed by the processor(s) of the processing sets of the system. The file for the PID 450 can also be held in a system register or in memory.

The process monitor 460 is able to access the file 452 in order to determine the unique PID 450 for the CMSD 400. PID 450 is truly unique to the actual invocation of the CMSD 400, and is not to be confused with a simple name which could be associated with various versions of the CMSD 400, or even with another process or program masquerading as the CMSD 400. The process monitor 460 then uses the PID 450 from the file 452 to access status information identified by the PID 450 (at 472) in a process table (/proc) 470. The process table 470 can be held in a system register or in memory. The process table forms part of the resources of the operating system 475 of the computer system. The status information at location 472 in the process table 470 defines the current status of the CMSD 400, and, in particular, indicates whether it is currently active, and healthy, or whether it has died.

The CMSD 400 is normally started in the same way as any system daemon by a system process at system start-up. Following this, the process monitor 460 is then started. The process monitor is then able to monitor the CMSD 400 for failure of the CMSD 400. If the process monitor 460 detects failure of the CMSD 400, it initiates a restart of the CMSD 400.

Figure 11:
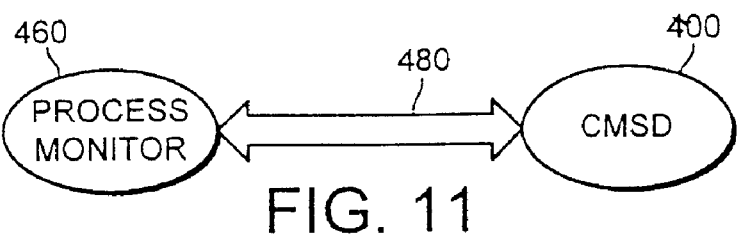
FIGS. 11, 12 and 13 represent various stages in initiating a configuration system daemon.
Figure 12:
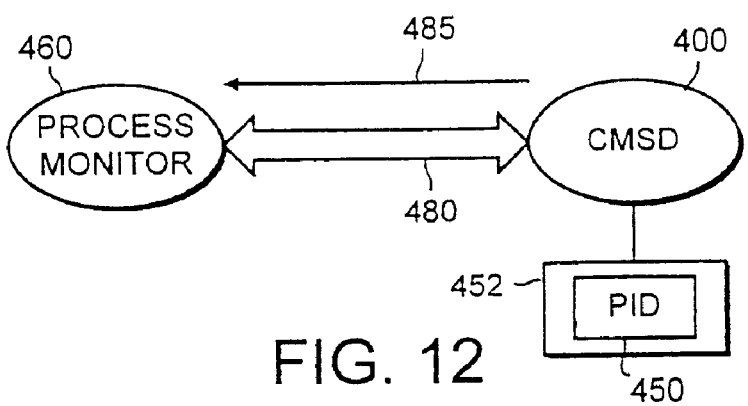
Figure 13:
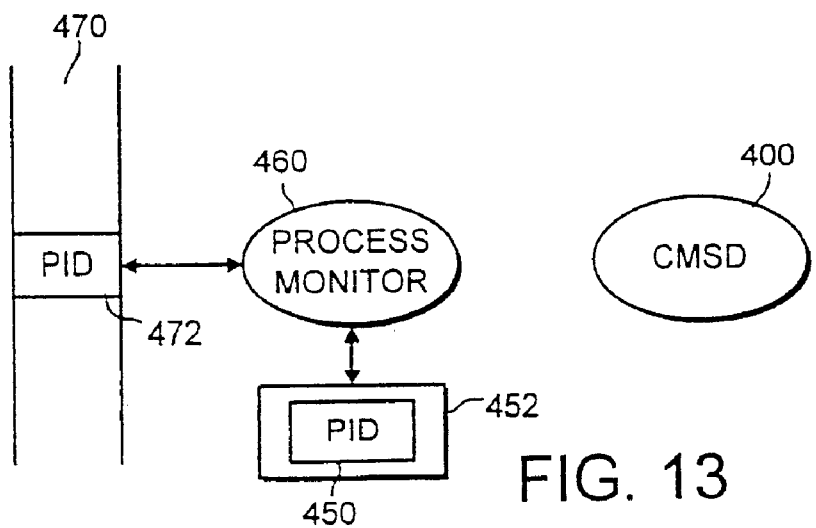

FIGS. 11–13 illustrate various steps for restarting the CMSD 400.

In a first step, illustrated in FIG. 11, following the detection of CMSD failure, the process monitor 460 starts the CMSD 400, which then proceeds to check that it is operable (i.e. is able to execute or function successfully). This can involve checking that the various data on which it relies is available and can be assembled into a database (if this has not already been done). The new CMSD is critical of its own operation at this stage and will indicate a fault if any inconsistencies or omissions are detected. At this step in the process, a handshaking exchange 480 occurs between the CMSD 400 and the process monitor 460 in order to test whether or not the CMSD 400 will execute successfully.

FIG. 12 illustrates a second step in the initialization of the CMSD 400. This step is reached where the CMSD determines that it is operable. The CMSD 400 then writes its unique process identification (PID) 450 to the predetermined location, or file 452 and also informs (at 485) the process monitor 460 that it is operable. The predetermined location, or file, 452 is a storage location, or file, known to the process monitor 460.

FIG. 13 illustrates the operational state of the process monitor 460 and the CMSD 400 following initialization of the CMSD 400. The process monitor 460 is operable to access to the PID 450 in the file 452 and to use the PID 450 from the file 452 to access the process status information 472 identified by the CMSD PID in the process table 470 of the system, operating system.

As described above, the CMSD 400 is started by a standard system start-up process prior to starting the process monitor 460. However, it would be possible to start the process monitor first and then to allow the process monitor 460 to discover the lack of a CMSD and to start the CMSD as described above with reference to FIGS. 11 to 13.

Figure 14:
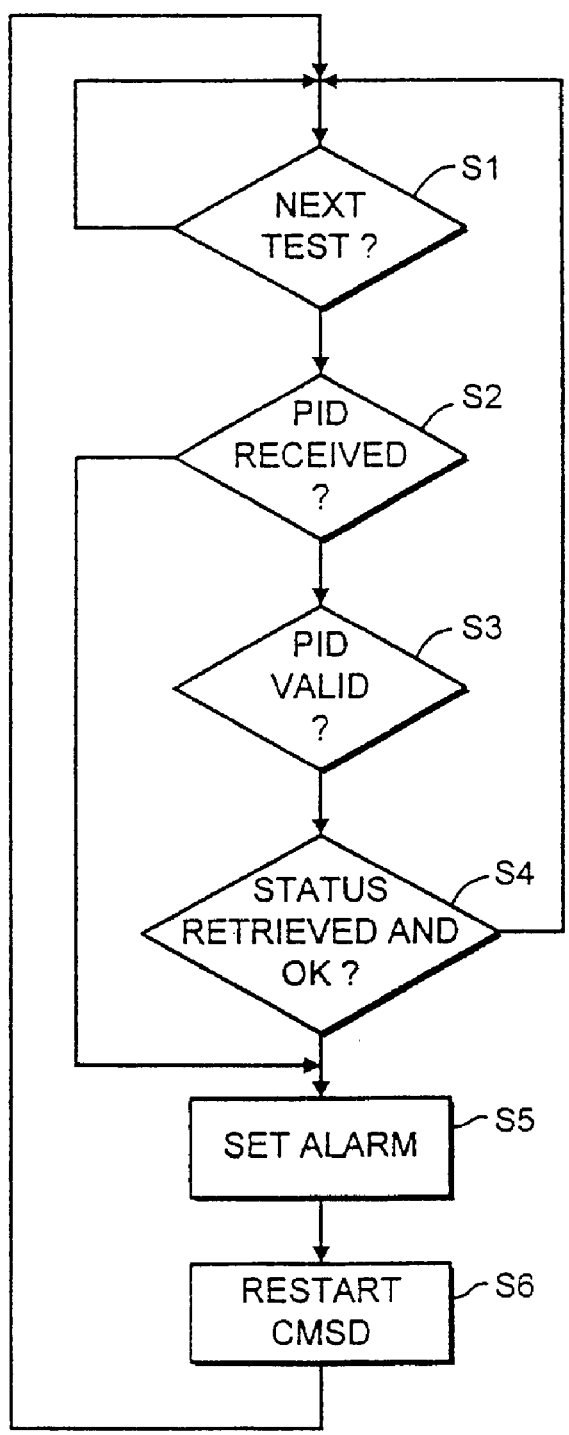
FIG. 14 is a flow diagram illustrating the operation of a process monitor.

FIG. 14 illustrates the operation of the process monitor 460 for verifying the correct operation of the CMSD 400.

The process monitor 460 is operable at predetermined times (as represented by step S1) to test the current status of the CMSD 400. This test could be performed after a predetermined interval and/or after specified system events have occurred.

In step S2 the monitor process 460 attempts to retrieve the PID 450 for the CMSD 400 from the predetermined file location 452. If the monitored process 400 is unable to retrieve the PID 450 for any reason, an alarm A is asserted in step S5 and an attempt is made to restart the CMSD 400 in step S6.

If the PID 450 is retrieved from the location 452, the validity of the PID 450 is tested in step S3. If the validity test on the PID is negative, the alarm A is asserted in step S5 and an attempt is made to restart the CMSD 400 in step S6.

If the validity test on the PID 450 is positive, the process monitor 460 then proceeds to use the PID 450 in step S4 to test the status of the CMSD 400 by accessing status information for the CMSD 400 at a location 472, identified by the PID 450 in the operating system process table 470.

The process monitor 460 is able to recognize various states for the CMSD 400. These include the states:

| | |
|---|---|
| CMSD_ok | CMSD is running correctly |
| CMSD_unknown | CMSD status cannot be determined |

-continued

| | |
|---|---|
| CMSD_dead | CMSD has died |
| CMSD_slow | CMSD appears to be alive but not responding |
| System_error | There is some system error affecting CMSD tests |
| CMSD_restart | There has been a restart error |

When the process monitor 460 identifies that the CMSD is running correctly, control passes from step S4 back to step S1, where the process monitor 460 waits until the next test on the operation of the CMSD 400 is to be performed.

Where the process monitor 460 identifies in step S4 that the CMSD appears to be dead, an alarm A is asserted in step S5 and an attempt is made to restart the CMSD 400 in step S6. Optionally, the process monitor 460 can be operable to set an alarm and send a warning message in step S5. The process monitor 460 is then operable to attempt, in step S6, to restart the CMSD 400 where the CMSD status is identified as being anything other than that the CMSD 400 appears to be running correctly.

Figure 15:
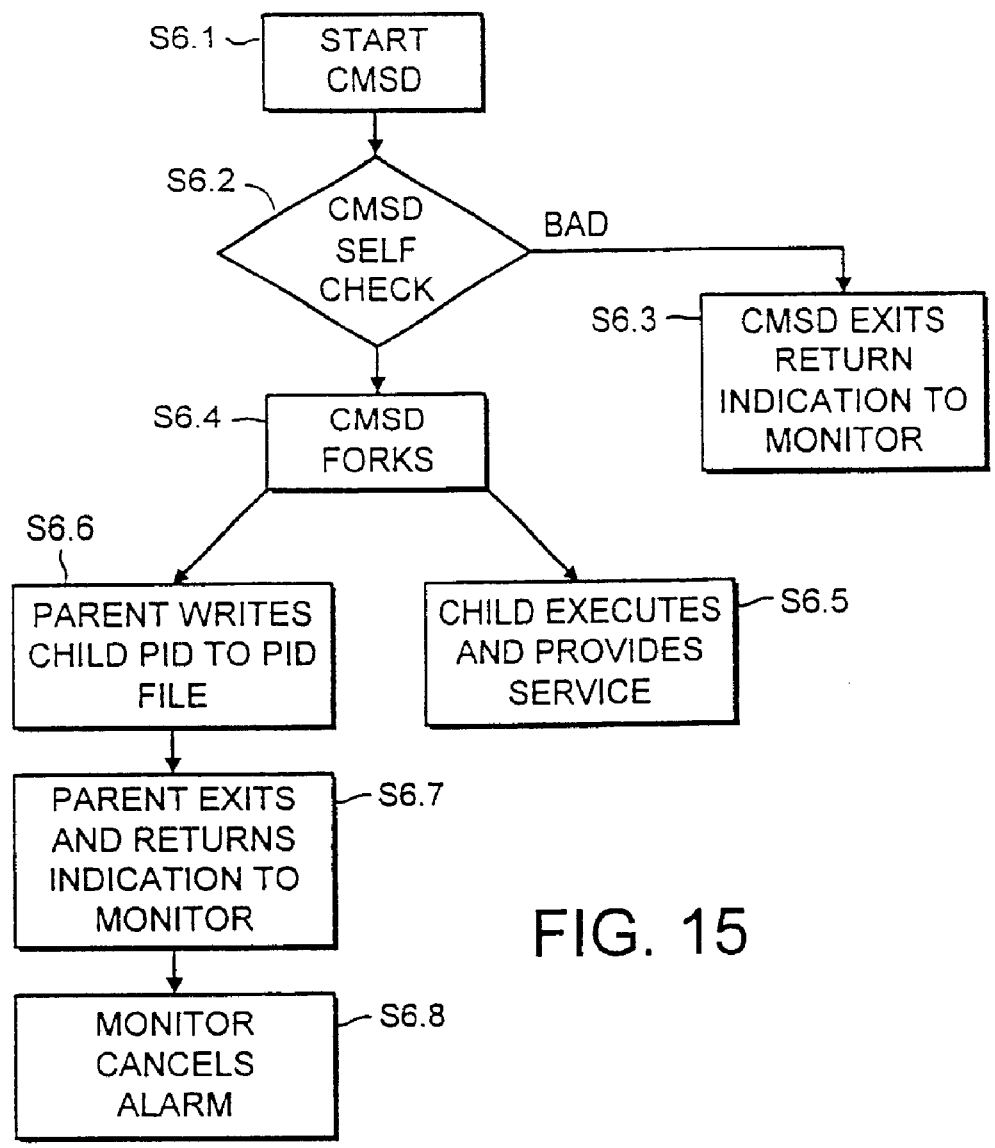
FIG. 15 illustrates details of the operation of the process monitor.

FIG. 15 illustrates step S6 of FIG. 14 in more detail. This corresponds essentially to the process represented in FIGS. 11, 12 and 13.

In step S6.1, the process monitor 460 starts the CMSD 400. In step S6.2 the CMSD 400 carries out self-checks as described with reference to FIG. 11, above. If the CMSD 400 is not operable, then the CMSD 400 exits at step S6.3 and a failed indication (e.g., a non-zero value) is returned to the monitor. Alternatively, if the CMSD 400 is operable, then in step S6.4 the CMSD 400 forks. The child CMSD 400 then executes in step S6.5 and provides appropriate CMSD services. In step S6.6 the parent CMSD 400 writes the child CMSD's PID to the PID file. The parent CMSD 400 then exits in step S6.7 and returns a successful indication (e.g., a zero value) that it can operate correctly to the process monitor 460. In step S6.8 the process monitor 460 cancels the alarm and sends a successful restart message. Otherwise, the alarm is not cancelled and an error message is generated to request intervention by a system operator. It can be seen that as a result of the above method, the CMSD backgrounds itself (i.e. it forks, then the parent exits), so that the monitor is not the parent.

In the process illustrated in FIG. 14, a simple test as to the current status of the CMSD 400 is performed in step S4 by means of the process monitor 460 referring to the process table 470. As an alternative, this test could be replaced by a test in which the process monitor 460 tries to establish a connection to the CMSD 400 and reacts to a returned value indicative of whether the CMSD is active or not. Although this more direct approach will give a higher degree of certainty as to whether this CMSD 400 is operating correctly, or not, it will involve a higher system overhead than the more simple test of testing the process table 470 of the operating system. Accordingly, the simple test, which provides sufficient reliability, is preferred in the present embodiment of the invention.

It is to be noted that the CMSD 400 utilizes a process similar to that illustrated in FIG. 15 for handing over control to a new CMSD 400 in a situation where, for example, the CMSDEFs 410 are changed. The process utilized by the CMSD 400, which is illustrated in FIG. 16, ensures that the process monitor 460 can reliably be informed of the transfer of control from the old CMSD 400 to the new CMSD 400.

Figure 16:
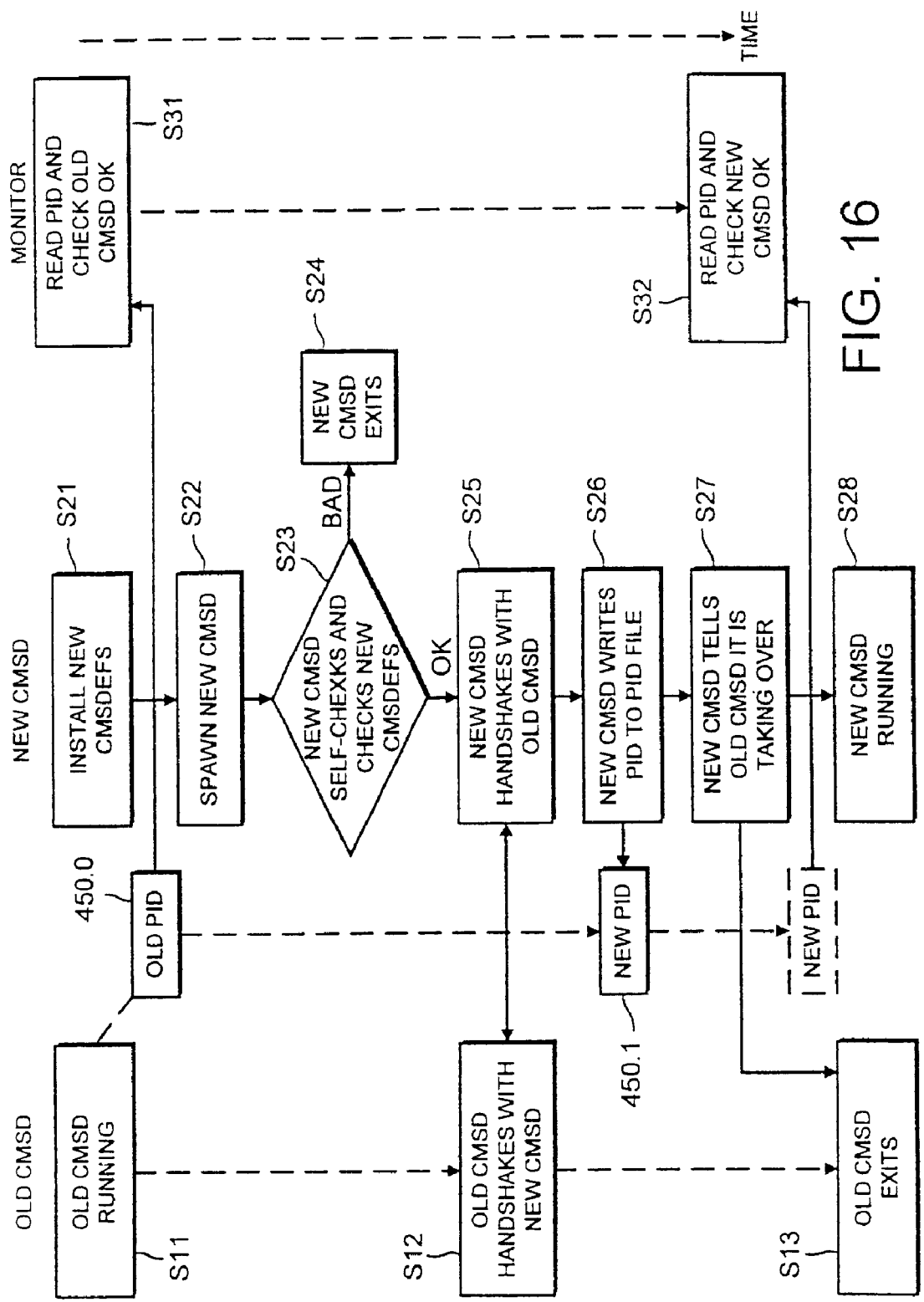
FIG. 16 is a flow diagram illustrating handing over of one process to another.

FIG. 16 illustrates various operations for an old CMSD process in the left-hand column, for a new CMSD process in the middle column and for the monitor process in the right hand column. Time increases from top to bottom in FIG. 16.

It is assumed in FIG. 16 that an existing (old) CMSD 400 is operating at S11 when new CMSDEFs 410 become available at S21. At that time, if the monitor process 400 reads the PID file 452, it will find the PID 450.0 for the old CMSD 400 and will check that the old CMSD is operating correctly.

An invocation of the CMSD 400 is associated with a particular set of CMSDEFs 410 in order to protect against errors in the CMSDEFs 410. Thus, it is necessary for a new CMSD 400 to be established to handle the new CMSDEFs 410. Accordingly, in step S22, a new CMSD 400 is spawned.

The new CMSD 400 then carries out self-checks at step S23 as before. If the new CMSD is non-operable, then the new CMSD exits at S24. Examples of situations where a new invocation of the CMSD 400 may not be able to execute correctly are where there is an error in the new CMSDEFs 410, or possibly where there is an error in a new version of the CMSD 400.

Alternatively, if the new CMSD is operable, the new CMSD 400 handshakes S12/S25 with the old CMSD 400. The new CMSD then writes its PID 450.1 to the PID file in step S26.

In step S27, the new CMSD tells the old CMSD that it is taking over and, in step S13, the old CMSD exits. In step S28 it is the new CMSD that is, therefore, running.

If, after step S26, the monitor process 460 reads the PID from the PID file, it will find the PID 450.1 for the new CMSD and will then check that the new CMSD is operating correctly.

It can also be seen from the above method that the new CMSD effectively 'backgrounds itself' and that the monitor is not the parent.

As mentioned above, the CMSD 400 is responsive to, and is operable to execute, CMSDEFs 410 for the current configuration of the system to be managed. The CMSD definitions 410 can be provided from a disk, or other storage medium forming part of the system, or can be supplied from a remote source. Configuration software in the form of scripts can also be used to generate configuration statements for configuring the CMSD 400. The configuration scripts can also be provided from a disk, or other storage medium forming part of the system, or can be supplied from a remote source. The CMSDEFs and scripts could also be provided from non-volatile storage in the FRUs inserted in the sockets in the chassis of the system.

The process monitor and/or the monitored process (CMSD) can be in the form of computer programs comprising computer code, or instructions, defining the functionality of the process monitor and/or monitored process, respectively. The process monitor and/or the CMSD can be provided on a carrier medium. The carrier medium can be any form of carrier medium for carrying computer program code, whether that be a magnetic, optical or any other form of data storage such as a tape, disk, solid state, or other form of storage providing random or read-only or any other form of access, or a transmission medium such as a telephone wire, radio waves, etc.

There follows a description of the manner in which the system can automatically be configured to take account of the FRUs, with their associated devices, which are inserted within the sockets of the chassis 200 of the system.

As mentioned earlier, the configuration management system of the present embodiment serves to provide high level fault tolerance monitoring for the fault tolerant computer system in that it models the interactions between the elements of the system and indeed manages the configuration of the system in response to user requirements. In order to be able to do this in an efficient manner, the component units and their constituent devices need to be configured in themselves and the computer system as a whole needs to be configured as regards, for example, the interactions between the units and/or the devices.

An advantageous method of auto-configuration of such components will be described hereinafter.

Figure 17:
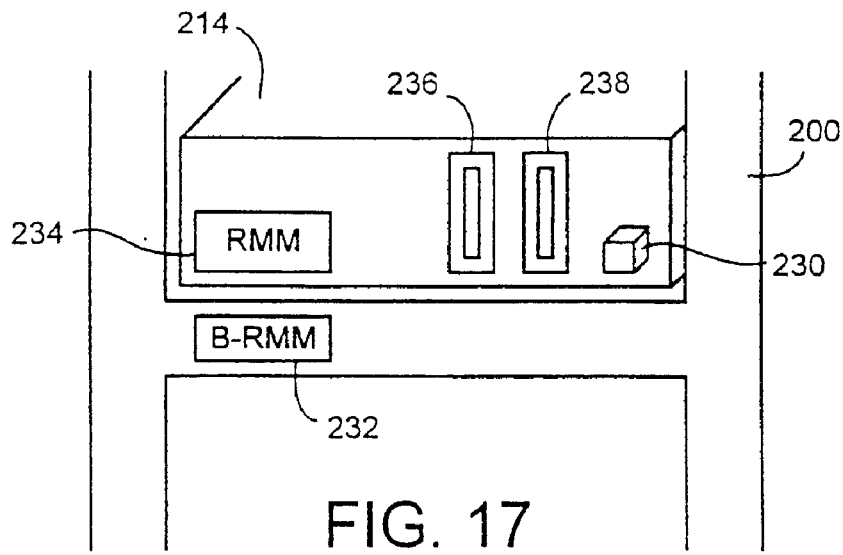
FIG. 17 is a schematic representation of a FRU in a chassis slot.

FIG. 17 illustrates a FRU 214, which is inserted in a slot 215 in the chassis 200. It can be seen that the FRU 214 carries a label 234 that can be matched to a label 232 adjacent to the slot 215 to assist in identification of the correct slot 215 for the FRU 214. As illustrated FIG. 17, the FRU 214 is an RMM FRU containing a tape drive 236 and a CD-ROM drive 238. The FRU 214 also includes a non-volatile memory 230 which contains configuration information to be used by the CMSD 400 in order correctly to configure the FRU 214 and its associated devices 236 and 238. In the present example of the invention, the non-volatile memory includes the following information:

EE.GEN.ID.PARTNO=5431
EE.GEN.ID.SERIALNO=9991
EE.MSP.FRUNAME=RMM
EE.MSP.DEV0.NAME=CDROM
EE.MSP.DEV0.SCSIID=0
EE.MSP.DEV1.NAME=TAPE
EE.MSP.DEV1.SCSIID=1

In a prior art FRU, only the part number from the information indicated above would have been present. In this embodiment, however, in addition to the part number, the non-volatile memory contains class information for the FRU, namely the FRUname: RMM. Other information is also provided as will be described later.

Figure 18:
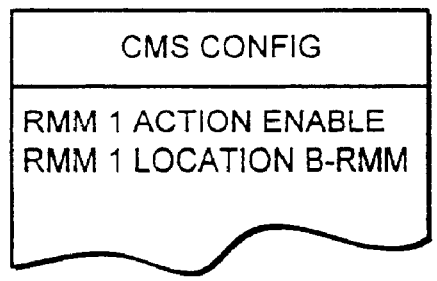
FIG. 18 represents a configuration file.

A component of the CMSD, forming a configuration (initialization) mechanism in the form of a program (CMSINITIALIZE) is operable to probe each slot, or FRU receiving location, of the chassis looking for the non-volatile memories 230. The class information for the FRU (here the FRU class name RMM) is used by the initialization component to derive a path to the CMS object definitions (CMSDEFs) for this class of FRU (here the RMM class). The CMSDEFs can include initialization code (initialization scripts) which are specific to the class of FRU and are operable on receipt of the FRU class and an instance number generated by the initialization component, to produce configuration information (configuration scripts) which are then stored in the CMS configuration file 404, which is held in system storage. If required, the initialization code can further access the FRU memory for further information needed to generate the initial configuration information. The configuration statements typically comprise an object class (e.g. RMM) and instance number (e.g. 1), an attribute (e.g. Action) and a value (e.g. enable). An example of entries in a CMS configuration file for the FRU 214 of FIG. 17 is illustrated in FIG. 18.

Figure 19:
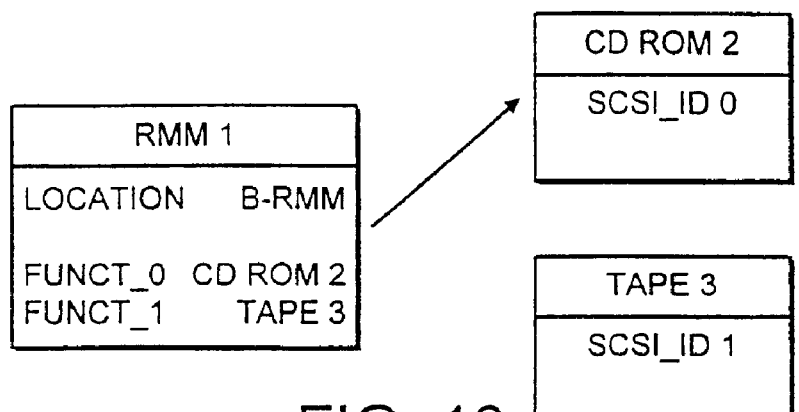
FIG. 19 represents an example of CMSDEFs and associated instances and attributes.

Once the CMS configuration table has been established and the initial checks have been completed, the CMSD is then able to establish which FRUs exist from the information stored in the CMS configuration file. In order correctly to set the device instances for the tape and CD ROM, the CMS "CMSDEFS" will further interrogate RMM FRU. The CMS model of the FRU and its devices are dynamically created from the information in the non-volatile memory 230. FIG. 19 illustrates an example of the CMSDEF's instances and attributes for the example FRU shown in FIG. 17.

Figure 20:
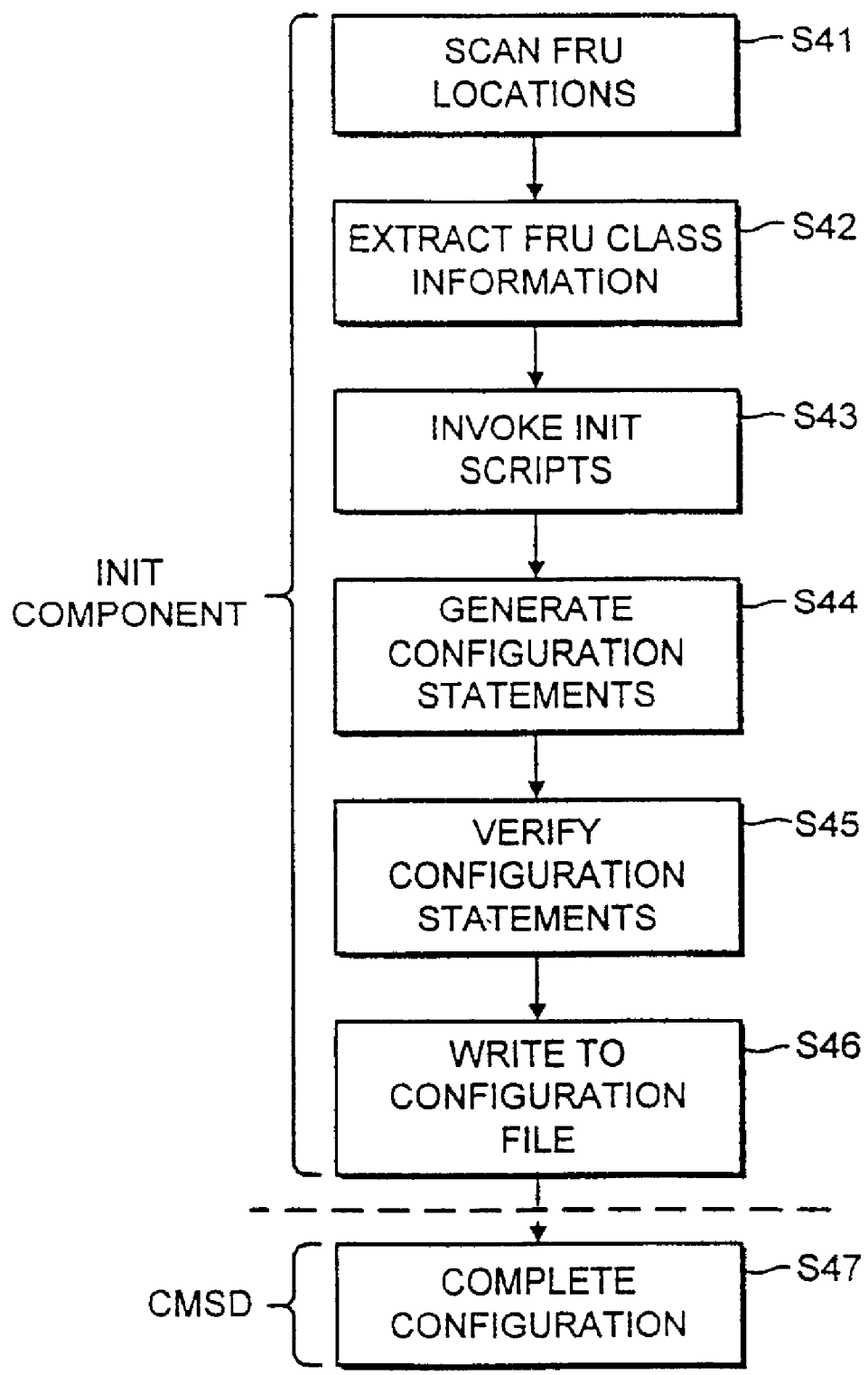
FIG. 20 is a flow diagram illustrating the process of configuring a FRU.

FIG. 20 is a flow diagram in summarizing the operation of a CMS initialization component 402 for initially configuring the FRU into the system, as described with reference to FIGS. 17 to 19. In an embodiment of the invention, this is only operable on the first initialization of the system, with the configuration file providing the necessary information on subsequent initializations. The use of a configuration file is preferred in the present fault tolerant system as it provides continuity between initializations and assists in identifying faults. It should be appreciated that in other systems, however, it may be desired to carry out this process at other times.

In step, S41, the CMS initialization component 500 scans the FRU receiving locations looking for non-volatile memory elements 320. As a result, when a FRU is inserted in such a receiving location, and before the FRU devices become integrated within the system, the CMS initialization component is able to detect the presence of that FRU.

In step S42, when the CMS initialization component identifies a non-volatile memory element in the FRU in a receiving location, it extracts the FRU class information (e.g., the FRU class name) provided therein.

This FRU class information is then used in step S43 by the CMS initialization component to access the initialization code (scripts) for the class identified by the class information. As indicated, the initialization scripts can be associated with the CMSDEFs for that class of FRU.

In step S44 the initialization scripts produce the configuration statements for the FRU as described with reference to FIG. 18. If required, this step can involve the initialization code accessing the non-volatile memory in the FRU.

The configuration statements output by the initialization scripts are verified by the initialization component in step S45 (this could be effected by a separate component of the CMS).

If the initialization component detects any errors during this checking, it discards all code lines associated with the FRU concerned. This is to ensure that the CMSD can start and so that subsequent corrective action can be undertaken. Otherwise, if the configuration statements check out, then the configuration statements are written to the configuration file 404 in step S46. Once all of the configuration statements have been stored in the CMS configuration file, and this all checks out, the control can be passed to the configuration system daemon.

The CMSD then completes the configuration of the system in step S47, including configuration of the FRU devices, as illustrated in FIG. 19. As part of the process it accesses the FRU memory, if required, to extract device class information and further device information. The CMSD is then able to configure the FRU devices as defined by the CMSDEFs and/or scripts. The CMSD is operable automatically to generate at least the physical and device hierarchies referenced in FIGS. 7 and 8 by establishing links between the various objects in accordance with the information in the CMSDEFs, which includes declarations for objects managed by the CMSD, state evaluations (statements for evaluating the states of objects), and transition code that is executed when a transition occurs between the states of an object. The service hierarchy may be partially configured with operator intervention (e.g., to specify specific services as required by the user).

This two-stage process enables the creation of a database for providing a representative state for starting the CMSD.

There has, therefore, been described a configuration management system which can enable automatic configuration of FRUs and their associated devices.

The memory in the FRUs can be used to store additional data other than that used specifically for the configuration processes described. For example, it can additionally be used to store certain status information relating to the system operation, in order that the state of the system can be consistent across re-starts. Also it can be used to store a history for the unit. This information could then be used off-line at some later stage, (for example on return of an allegedly faulty FRU) to establish whether it is the FRU or, perhaps, a slot in which it has been inserted, which is faulty.

There has been described a configuration management system including a configuration management system daemon (CMSD). The continued correct functioning of the CMSD can be ensured by detecting the failure of the CMSD and restarting the CMSD as appropriate. Thrashing of the system caused by continual, rapid attempts to restart a CMSD that would never execute successfully can be avoided.

It will be appreciated that although particular embodiments of the invention have been described, many modifications/additions and/or substitutions may be made within the spirit and scope of the present invention as defined in the appended claims.

For example, although an example of the invention has been described in the context of a fault tolerant computing system, it is not limited in its application to such a system. Indeed, it could indeed find application in any system where it is desirable to monitor the operation of a potentially critical process, for example a process controlled by a daemon program. Also, although in the preferred embodiments the process monitor and the monitored process (CMSD) are implemented by program code, it will be appreciated that they could, at least in part, be implemented by means of special purpose hardware, for example using one or more special purpose circuits, such as application specific integrated circuits (ASICs).

Accordingly, the particular example described is intended to be illustrative only, and not limitative.

What is claimed is:

1. A method of monitoring a process in a computer system using a process monitor, where the monitored process is not a child of the process monitor; the method including steps of:
   a) uniquely determining the identity of a monitored process and verifying correct operation of the monitored process;
   b) in the absence of verification of the correct operation of the monitored process, causing the monitored process to restart, the restarted process initially checking that it is operable and, if it is operable, indicating to the process monitor that it is operable and backgrounding itself, the monitored process, on successful restart, uniquely identifying itself to the computer system.

2. The method of claim 1, wherein step (b) further comprises the restarted monitored process writing process identification information uniquely identifying itself to a predetermined location.

3. The method of claim 1, wherein step (b) further comprises:
   in the absence of an operable indication from the restarted monitored process, the process monitor issuing an error message and preventing further attempts to restart the monitored process.

4. The method of claim 1, wherein the process monitor is a monitor process.

5. The method of claim 1, wherein the monitored process is a daemon process.

6. The method of claim 1, wherein the step (a) comprises attempting access to a predetermined location for process identification information uniquely identifying a monitored process.

7. The method of claim 6, wherein the predetermined location is a predetermined file.

8. The method of claim 1, wherein the monitored process is a configuration management system daemon.

9. The method of claim 8, wherein the configuration management system daemon responds to object definitions.

10. The method of claim 1, wherein step (a) comprises using the unique identity of the monitored process to verify correct operation of the monitored process.

11. The method of claim 10, wherein step (a) comprises interrogating an operating system of the computer system to verify correct operation of the monitored process.

12. The method of claim 10, wherein step (a) comprises requesting a service from the monitored process for verifying correct operation thereof.

13. A method of restarting a process to be monitored in a computer system, the method comprising:
   spawning a new process; and
   the new process checking that it is operable and, in response to determining that the new process is operable:
      uniquely identifying itself to the computer system; and
      causing an existing monitored process to terminate, whereby the new process becomes the monitored process.

14. The method of claim 13, comprising recording unique process identification information for the new process at a predetermined location for uniquely identifying the new process.

15. The method of claim 13, wherein the existing monitored process is a first invocation of a configuration management system daemon operable on a first set of object definitions, and the new process is a second invocation of a configuration management system daemon operable on a second set of object definitions.

16. The method of claim 13, wherein the restarted monitored process is selected from:
   a new process, an upgrade version of a process, or an existing process.

17. A computer system comprising a process to be monitored, the process to be monitored being configured, on successful initiation, uniquely to identify itself to the system, and a process monitor configured: uniquely to determine the identity of a monitored process; to verify correct operation of the monitored process; and, in the event of being unable to verify correct operation of the monitored process, to cause the monitored process to restart, wherein the monitored process, on successful restart, initially checks that it is operable and, if it is operable, indicates to the process monitor that it is operable, backgrounds itself and, uniquely identifies itself to the system.

18. The computer system of claim 17, wherein the process monitor is a monitor process.

19. The computer system of claim 17, wherein the monitored process is a daemon process.

20. The computer system of claim 17, comprising at least one processor set for executing the process monitor and the monitored process, and memory forming said storage.

21. The computer system of claim 17, wherein the restarted monitored process is selected from a new process, an upgrade version of a process, or an existing process.

22. The computer system of claim 17, wherein the process monitor is configured to attempt access a predetermined storage location of the computer system for process identification information uniquely identifying a monitored process.

23. The computer system of claim 22, wherein the predetermined location is a predetermined file held in computer memory.

24. The computer system of claim 17, wherein the restarted process to be monitored writes processor identification information uniquely identifying itself to a predetermined location after verifying that it is able to function successfully.

25. The computer system of claim 24, wherein the process monitor is configured to issue an error message and to prevent further attempts to restart the monitored process in the absence of an indication from the restarted monitored process that it is operable.

26. The computer system of claim 17, wherein the process monitor is configured to use the unique identity of the monitored process to verify correct operation of the monitored process.

27. The computer system of claim 26, wherein the process monitor is configured to interrogate an operating system of the computer system to verify correct operation of the monitored process.

28. The computer system of claim 26, wherein the process monitor is configured to request a service from the monitored process for determining correct operation thereof.

29. The computer system of claim 17, wherein the monitored process is a configuration management system daemon.

30. The computer system of claim 29, wherein the configuration management system daemon responds to object definitions.

31. The computer system of claim 30, wherein the computer system is a fault-tolerant computer system including a plurality of processing sets operable in lockstep, the monitored process being a configuration management system daemon responsive to configuration system definitions representative of elements of the fault tolerant computer system.

32. A computer program on a carrier medium for the computer system of claim 17, the computer program forming a configuration management system comprising program code configured, on being initiated by a process monitor, to check that it is operable; and, if so, to provide an indication of this to the process monitor prior to detaching itself from the process monitor, so as not to be a child of the process monitor.

33. The computer program of claim 32, comprising a configuration management system daemon.

34. The computer program of claim 32, comprising program code forming a configuration system management daemon responsive to configuration management system definitions representative of computer system resources.

35. The computer program of claim 32, further configured to identify itself to the system storage after verifying that it is operable.

36. The computer program of claim 35, further configured to record process identification information uniquely identifying itself at a predetermined location in storage for uniquely identifying itself to the system.

37. A computer program on a carrier medium, the computer program forming a process monitor including program code configured uniquely to determine the identity of a monitored process, to verify correct operation of the monitored process, and, in the event of being unable to verify correct operation of the monitored process, to cause the monitored process to restart, such that the monitored process is not a child of the process monitor, and wherein the monitored process, on successful restart, initially checks that it is operable and, if it is operable, indicates to the process monitor that it is operable, backgrounds itself, and uniquely identifies itself to the system.

38. The computer program of claim 37, wherein the process monitor is configured to attempt access to a predetermined storage location of the computer system for process identification information uniquely identifying a monitored process.

39. The computer program of claim 37, wherein the process monitor is configured to issue an error message and to prevent further attempts to restart the monitored process in the absence of an indication from the restarted monitored process that it is operable.

40. The computer program of claim 37, wherein the restarted monitored process is selected from: a new process, an upgrade version of a process, or an existing process.

41. The computer program of claim 37, wherein the process monitor is a monitor program carried by a carrier medium.

42. The computer program of claim 37, wherein the process monitor is configured to use the unique identity of the monitored process to verify correct operation of the monitored process.

43. The computer program of claim 42, wherein the process monitor is configured to interrogate an operating system of the computer system to verify correct operation of the monitored process.

44. The computer program of claim 42, wherein the process monitor is configured to request a service from the monitored process for determining correct operation thereof.

* * * * *